United States Patent [19]
Koski

[11] 4,134,607
[45] Jan. 16, 1979

[54] MEMBER FOR WELDING TO ANOTHER MEMBER

[75] Inventor: Jerry V. Koski, Parma, Ohio

[73] Assignee: Parker-Hannifin Corporation, Cleveland, Ohio

[21] Appl. No.: 654,335

[22] Filed: Feb. 2, 1976

[51] Int. Cl.² .............................................. F16L 13/02
[52] U.S. Cl. ...................................... 285/173; 29/512; 219/137 R; 285/286; 285/329
[58] Field of Search ................... 285/329, 22, 21, 286, 285/173

[56] References Cited

U.S. PATENT DOCUMENTS

| Re. 22,725 | 2/1946 | Von Ahrens | 285/286 X |
| 1,281,498 | 10/1918 | Brevig | 285/329 X |
| 1,299,396 | 4/1919 | Coleman | 285/286 X |
| 1,586,984 | 6/1926 | Foster | 285/286 X |
| 1,968,562 | 7/1934 | Lofgren | 285/329 |
| 3,033,145 | 5/1962 | Thielsch | 285/286 X |
| 3,119,632 | 1/1964 | Skinner | 285/286 X |
| 3,439,941 | 4/1969 | Nicol | 285/21 |
| 3,585,345 | 6/1971 | Jespersen | 219/83 |
| 3,805,011 | 4/1974 | Knaefel et al. | 219/60 A |

FOREIGN PATENT DOCUMENTS 202032  3/1939  Switzerland ............................. 285/286

Primary Examiner—Thomas F. Callaghan
Attorney, Agent, or Firm—John N. Wolfram

[57] ABSTRACT

A member to be welded to another member by means of a welding tool that clamps the two members together with the weld location in register with a welding tip carried by the tool. Attached to the member is a welding collar of a material different than the material of the members to be welded together. The collar is located relative to the tip by an interlocking connection between the tool and the one member.

7 Claims, 3 Drawing Figures

MEMBER FOR WELDING TO ANOTHER MEMBER

BACKGROUND OF THE INVENTION

U.S. Pat. No. 3,805,011 discloses a method and a tool for welding together two tubular members. One member has an enlargement at its end and integral therewith and which is positionable in register with a welding tip carried by the tool. The enlargement is heated by the tip to fuse or weld the same to the other member. In some cases, such as in nuclear power plant installations, it is desirable to use a weld metal that is different from the metal of the members being joined.

SUMMARY OF THE INVENTION

The present invention provides a collar of weld metal attached to one of the members in a manner to permit use of a welding tool such as that disclosed in U.S. Pat. No. 3,805,011. The one member has a tubular projection or reduced diameter at one end and a transverse shoulder at the inner end of the projection. The welding collar has a bore that closely fits over the inner end of the projection and it has a counterbore at its outer end to form an inner cylindrical wall and an inner transverse surface for receiving and radially and axially locating an end of the other member to be joined. The collar has a frusto-conical surface between the bore and counterbore against which the tubular projection is flared to retain the collar onto the one member. The one member also has a raised circular rib to interlockingly engage a groove in the welding tool for properly locating the welding collar relative to the welding tip of the tool.

The method includes the steps of securing the welding collar on the one member before placing the members into a welding tool having a welding tip. In securing the welding collar on the one member, the collar is fitted over the extension and then a flaring tool with a tapered leading surface is inserted into the member to flare the extension into engagement with the frusto-conical surface on the welding collar. Next, the one member with the mounted welding collar is located in the welding tool such that the transverse shoulder on the welding collar and the end of the flared extension are opposite the welding tip. The other member is then located in the welding tool in abutment with the welding collar and one member so that in the weld position the connection of the welding collar and the members is opposite the welding tip whereupon energization of the welding tip fuses the members and welding collar together.

DETAIL DESCRIPTION

Figure 1:
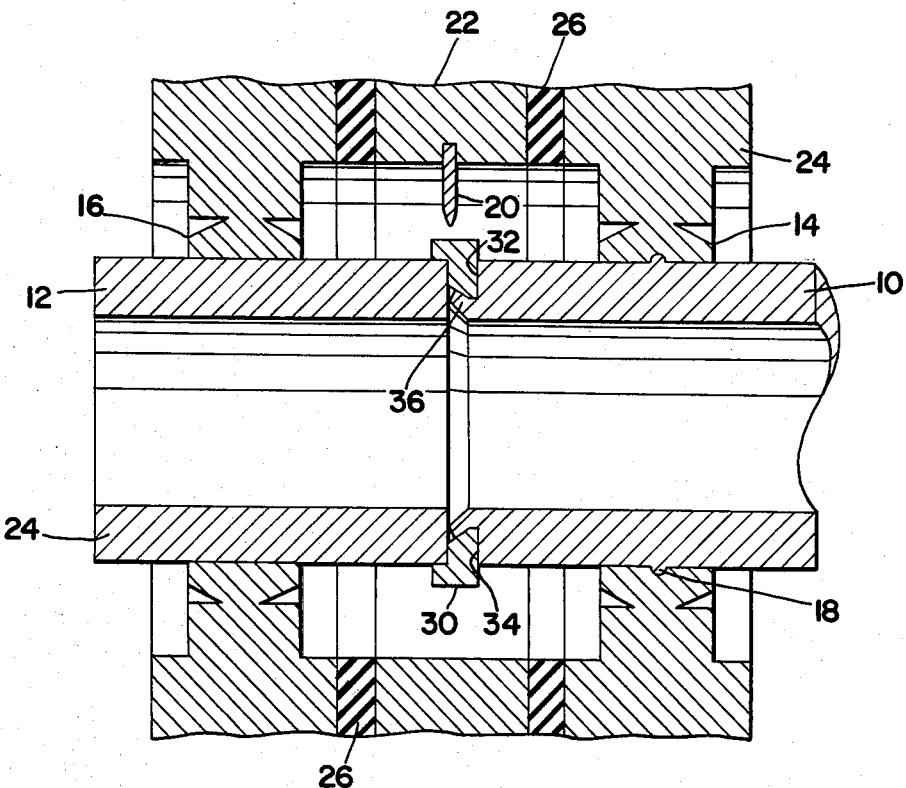
FIG. 1 is a partial cross section view of a welding tool holding a pair of tubular members with a welding collar therebetween in a weld position.

In the welding apparatus illustrated in FIG. 1, a pair of tubular members, 10 and 12, are held in a weld position by locating means, 14 and 16. Including a groove, locator 14 cooperates with a rib 18 on the one member 10 to position the same so that its end is opposite a welding tip 20. Mounted in a carrier 22 the welding tip is insulated from the housing 24 by insulating elements 26.

In order to carry a welding collar or ring 30, the one member 10 has an outer recess 32 which forms a transverse face 34 and a reduced diameter extension, or root 36, as it is commonly referred to.

Figure 2:
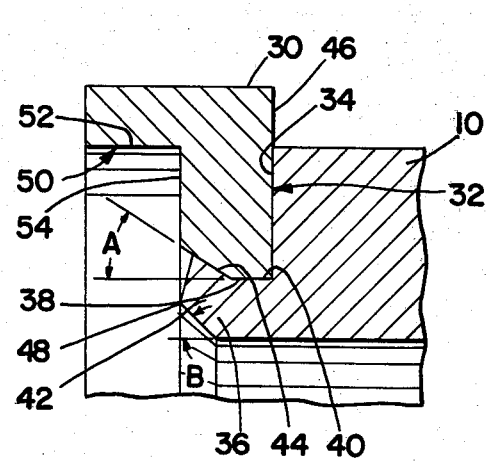
FIG. 2 is an enlarged partial cross section view of the welding collar mounted on one of the tubular members.

As more clearly depicted in FIG. 2, the extension 36 forms a reduced diameter 38 which is in sliding fit with the inner cylindrical bore 40 of welding collar 30. For the purpose of rigidly securing or mounting the welding collar to the one member, a portion 42 of extension 36 flares outwardly to engage a frusto-conical surface 44 of angle A on the welding collar which is adjacent inner bore 40. Abutting the transverse face 34 via radial surface 46, the welding collar is wedged against the transverse face and the flared portion of the extension when it is rigidly secured to the member so that the welding collar is prevented from axial as well as rotating movement in the secured position.

In order to receive the other member when the welding collar is secured on the one member, the welding collar has an inner recess 50 forming a counterbore 52 and a transverse shoulder 54. The counterbore has an inner diameter substantially equal to the dimension of the outer diameter of the other member so that the outer diameter of the other member is in sliding fit with the counterbore for telescoping into the same.

Figure 3:
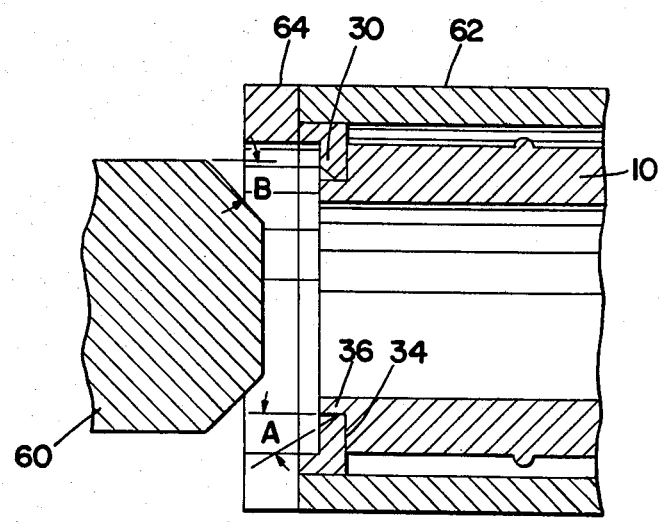
FIG. 3 is a partial cross section view showing the method and apparatus for attaching the welding collar to the one member.

Turning to FIG. 3 the welding collar is shown with the inner bore in sliding fit with the reduced diameter of the extension and the radial surface is abutting the transverse face of the one member. In axial alignment with the one member, a flaring tool 60 with a leading frusto-conical surface of angle B at its forward end opposes the extension of the one member. In order to flare the ridge outwardly, thereby wedging the welding collar to the one member, the flaring tool is pressed against the extension so that the leading surface engages the extension and expands a portion of the extension into engagement with the frusto-conical surface on the welding collar. For an angle A on the welding collar of about 30° an angle B on the flaring tool of about 45° is preferred, so that the expanding portion of the extension is prevented from extending axially towards the incoming flaring tool and confined substantially to outward radial flaring. Consequently, in the mounted position the end of the flared extension at 48 is substantially in radial alignment with the transverse shoulder of the welding collar.

In operation, the welding collar is secured to the one member in the manner mentioned above before placing the one and other members within the welding tool as shown in FIG. 1. A groove on locator 14 cooperates with a rib 18 to position the end of the extension in a weld plane coincident with the welding tip 20 and near thereto. Such positioning also locates the transverse shoulder 54 in the weld plane so that when the other member is telescoped into counterbore 52, the end of the other member contacts the transverse shoulder of the welding collar and the end of the flared extension on the one member in the weld plane. Locator 16 is then tightened to secure the other member in contact with the welding collar and the one member. Next, covers (not shown) are closed and locators, 14 and 16, are locked in a clamping hold on the members. The welding tip is then energized and the carrier rotated to complete the weld, fusing the welding collar and both members around the circumference of the connection in the weld plane.

Preferably, the welding collar is made from a material referred to by the American Welding Society as ER16-8-2 while the tubular members are stainless steel.

In accordance with a further aspect of the method for mounting the welding collar on the one member, as illustrated in FIG. 3, a socket or holder 62 slips over the member 10 and is in close sliding fit with the welding collar 30 so that the welding collar will not expand radially when the flaring tool expands the extension against the welding collar. The socket carries a flange 64 which contacts the welding collar to retain the same against the transverse shoulder 34 on the one member. Suitable means (not shown) are provided for connecting the flange 64 to the socket 62.

I claim:

1. A first metallic member to be welded to a second metallic member, said first member having a recess formed therein at one end thereof, said recess formed by a transverse shoulder and an extension projecting axially outwardly therefrom to receive a welding collar which is fixedly attached thereto, said welding collar being of a metal different from the metal of said members and completely filling said recess, said welding collar having an inner recess formed by an internal cylindrical wall and a transverse surface to receive and radially and axially locate an end portion of the second member relative to the first member.

2. The first member of claim 1 in which said collar has an opening therethrough with an axially outwardly facing surface, and said extension projects axially outwardly into said opening and in engagement with said outwardly facing surface to retain the collar against said transverse shoulder.

3. The first member of claim 2 in which said outwardly facing surface is frusto-conical.

4. The first member of claim 2 in which said extension does not project axially beyond said transverse surface.

5. The first member of claim 2 in which said extension is tubular and flared radially outwardly toward its outer end.

6. The first member of claim 3 in which the included angle of said frusto-conical surface is about 60° and the radially inner surface of said extension is outwardly flared with an included angle of about 90°.

7. The first member of claim 2 in which said opening has a cylindrical wall at its inner end and a frusto-conical wall at its outer end, and said extension has surfaces substantially in engagement with said cylindrical and frusto-conical walls.

* * * * *